United States Patent
Kaytan

(10) Patent No.: US 8,247,480 B2
(45) Date of Patent: *Aug. 21, 2012

(54) PVC COMPOSITIONS

(76) Inventor: Hasan Kaytan, Huerth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,354

(22) Filed: Apr. 30, 2010

(65) Prior Publication Data

US 2010/0216919 A1 Aug. 26, 2010

Related U.S. Application Data

(63) Continuation-in-part of application No. PCT/US2009/039600, filed on Apr. 6, 2009.

(60) Provisional application No. 61/174,151, filed on Apr. 30, 2009, provisional application No. 61/043,929, filed on Apr. 10, 2008.

(51) Int. Cl.
*C08K 5/34* (2006.01)
*C08L 27/00* (2006.01)
(52) U.S. Cl. ....................................... 524/104; 524/569
(58) Field of Classification Search .................. 524/104, 524/569
See application file for complete search history.

(56) References Cited

U.S. PATENT DOCUMENTS

| 7,411,012 B2 * | 8/2008 | Kaytan | 524/104 |
| 2007/0112104 A1 * | 5/2007 | Kaytan | 524/99 |

* cited by examiner

*Primary Examiner* — Ling Choi
*Assistant Examiner* — Hui Chin
(74) *Attorney, Agent, or Firm* — William J. Davis; Thompson Hine LLP

(57) ABSTRACT

A PVC composition comprising PVC and a $C_4$-$C_{30}$ alkyl pyrrolidone additive present in an amount of 0.1 to 20 phr sufficient to improve PVC processing or treatment compared to a control composition without said additive.

15 Claims, 1 Drawing Sheet

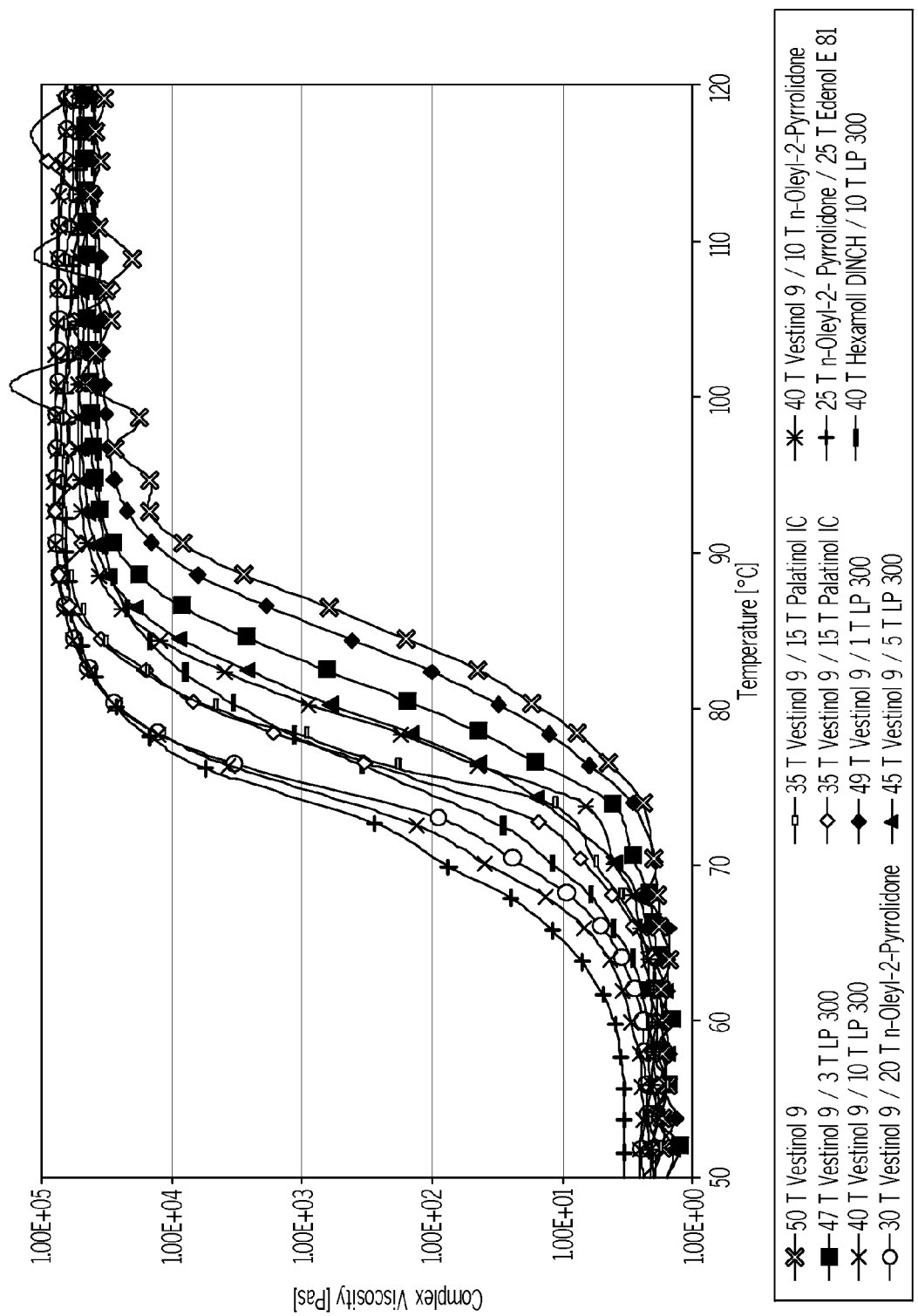

PVC COMPOSITIONS

CROSS REFERENCE TO RELATED APPLICATIONS

This application claims the benefit of U.S. Provisional Patent Application Ser. No. 61/174,151 filed on Apr. 30, 2009 and is a continuation-in-part of International Application No. PCT/US2009/039600 filed on Apr. 6, 2009, which claims the benefit of U.S. Provisional Patent Application Ser. No. 61/043,929 filed on Apr. 10, 2008, the disclosures of which are hereby incorporated by reference in their entirety.

FIELD

The present application relates to a PVC composition comprising a $C_4$-$C_{30}$ alkyl pyrrolidone in an amount of 0.1 to 20 phr, in some cases 1 to 15 phr, and in other cases 3 to 12 phr, sufficient to improve at least one aspect relating to PVC processing. The improvement in processing may include one or more of the following: decreased gelling temperature; increased gelling speed; transparency and homogeneity; reduced haze and hardness; improved melt flow; impact resistance and filler compatibility; increased cold flexibility; improved crack resistance and increased secondary plasticizers/extenders compatibility. The present application relates to plasticized PVC compositions that can be used to prepare rigid, semi-rigid and flexible PVC products by calendering, extrusion, injection molding, plastisol, foam, and dispersion.

BACKGROUND

U.S. Pat. No. 7,411,012 discloses the use of alkyl pyrrolidones as plasticizers to provide long term plastification to PVC so as to impart flexibility, softness, extensibility and or/lower melting temperature to PVC compositions. International Publication No. WO2009/126552 discloses a stabilized, plasticized PVC composition including an alkyl pyrrolidone plasticizer and an organic phosphite ester stabilizer. The disclosed compositions exhibit excellent early color performance and heat stability at higher temperatures. The present application further demonstrates improvements in the processing conditions of PVC compositions used in the production of flexible, semi-rigid, rigid PVC.

Poly(vinyl chloride), hereafter referred to as PVC, is extensively used in many applications. In use, additives such as plasticizers, thermal stabilizers, lubricants, pigments, fillers, impact modifiers, and flame retardants are generally employed to produce PVC compositions having desired properties.

One of the major hurdles during processing of PVC is the requirement of high temperature that tends to degrade PVC ultimately by various processes like dehydrochlorination, auto-oxidation, mechano-chemical chain scission, cross linking of macromolecules and condensation reactions. These changes lead to altered physio-mechanical and rheological properties of PVC.

Rigid and semi rigid applications of PVC have enormous commercial value. Around 70% of the total PVC volume is used for manufacturing of rigid PVC goods (like pipes and tubes, window and door profiles, rigid sheets, packaging and many others). Since the processing temperature of rigid and semi-rigid PVC is significantly higher than flexible PVC, which typically contains a large amount of plasticizers, there is need for additives for lowering the gelling temperatures, increasing the gelling speed and homogeneity.

Plasticizers can produce so called anti-plasticizing effect when used at lower levels from about 3 phr to about 15 phr. In semi-rigid applications commonly 20 to 30 phr of the plasticizers are used. Below those levels a plasticizing effect is typically not noticeable.

As disclosed in WO 2007/059123, alkyl pyrrolidone with different alkyl moieties can effectively plasticize PVC, in an amount from 5 to 100 phr, for sufficiently long term. By lowering the processing temperatures, alkyl pyrrolidones can also facilitate heat stabilization of the composition.

However, processing of PVC involves a number of other challenges such as keeping the gelling temperature low so as to reduce the manufacturing or processing cost and controlling the gelling speed. High haze that can result from other additives is also highly undesirable.

Thus it would be beneficial to have a cost effective additive blend that can reduce the processing complexities and simplify the manufacturing process.

Accordingly, in accordance with one aspect, a PVC composition comprising an additive that improves processing is disclosed. The additive comprises a blend of alkyl pyrrolidones in an amount of 0.1 to 20 phr sufficient to improve PVC processing.

More particularly, the additive can result in an improvement in the manufacturing process of rigid/semi-rigid/flexible PVC goods. Examples of the types of improvements that may be realized include decreased gelling temperature; increased gelling speed; transparency and homogeneity; reduced haze and hardness; improved melt flow; impact resistance and filler compatibility; increased cold flexibility; and improved crack resistance.

SUMMARY

The present application discloses PVC compositions comprising a $C_4$-$C_{30}$ alkyl pyrrolidone in an amount of 0.1 to 20 phr sufficient to improve PVC treatment/processing. In some aspects, the amount is 1 to 15 phr, and in other aspects the amount is 3 to 12 phr.

The $C_4$-$C_{30}$ alkyl pyrrolidones useful herein include linear, branched or cyclo-alkyl pyrrolidones. $C_8$-$C_{18}$ alkyl pyrrolidones, which are liquid at room temperature, are particularly useful.

PVC compositions containing the processing additive described herein exhibit improved processing relative to compositions without the additive. One or more of the following improvements may be realized by including the additive in a PVC composition: decreased gelling temperature; increased gelling speed; transparency and homogeneity; reduced haze and hardness; improved melt flow; impact resistance and filler compatibility; increased cold flexibility; improved crack resistance; and increased secondary plasticizers/extenders compatibility.

The plasticized PVC compositions described herein may be used to prepare rigid, semi-rigid and flexible PVC. The PVC composition can be processed by calendering, extrusion, injection molding, plastisol, foam, and dispersion.

The PVC product can be used to manufacture goods like pipes, tubes, windows, door profiles, rigid sheets, packaging, insulation jackets for wires and cables, liners for pools, ponds, landfill, irrigation trench, sheeting for water beds, fabric coating, carpet backing, automotive parts like dashboards, door panels, arm rests, car underbody coating, tiles, wall coverings, flooring sheets, packaging films, conveyor belts, tarpaulins, roofing membranes, electrical plugs and connections, inflatable sheets, toys, garden hose, pipes and tubing, agricultural films, refrigerator and freezer gasketing, shoe soles and uppers, boots, and fishing lures.

BRIEF DESCRIPTION OF THE DRAWING

The FIGURE illustrates the gelling curves for PVC compositions at different concentrations of alkyl pyrrolidones compared to compositions containing typical additives.

DETAILED DESCRIPTION

The present application discloses PVC compositions containing an additive composition comprising a blend of alkyl pyrrolidone in an amount of 0.1 to 20 phr, more particularly 3 to 12 phr.

Alkyl pyrrolidones with different alkyl moieties can effectively plasticize PVC alone or in combination with other plasticizers in an amount of 5 to 100 phr. As disclosed herein, alkyl pyrrolidones can also have impact on the processing of flexible, semi-rigid, and rigid PVC; and also on the properties of goods made out of these materials when used as an additive in an amount of mere 0.1 to 20 phr (parts per hundred of PVC resin), more particularly 1 phr to 15 phr, and yet more particularly 3 to 12 phr.

The PVC composition of the present application has improved properties and/or processability. Examples of improvements include decreased gelling temperature; increased gelling speed; transparency and homogeneity; reduced haze and hardness; improved melt flow; impact resistance and filler compatibility; increased cold flexibility; improved crack resistance; and increased secondary plasticizers/extenders compatibility.

Suitable alkyl pyrrolidones for use herein include $C_4$-$C_{30}$ linear, branched or cyclo-alkyl pyrrolidones, more particularly $C_6$-$C_{20}$ alkyl pyrrolidones including cyclohexyl pyrrolidone. Particularly useful additives are those that are liquid at room temperature, such as linear N-octyl($C_8$)pyrrolidone (NOP) and linear N-dodecyl($C_{12}$)pyrrolidone (NDP), which are commercially available as Surfadone® LP-100 and 300, respectively, sold by International Specialty Products (ISP).

These alkyl pyrrolidones perform effectively as plasticizers in an amount of at least 5 phr, more particularly, 10 to 100 phr of the PVC. This amount is sufficient to plasticize the PVC into a flexible state. However, even in an amount as low as 0.1 phr, the additive can improve processing of the PVC composition.

Alkyl pyrrolidones when used alone as primary plasticizer or as the major part of a plasticizer blend reduce the gelling temperature of PVC, which can be up to 20-60° C. lower than that with the other plasticizers known in the art such as phthalates, adipates, polymeric, etc. This is mainly attributed to the extremely low solubility temperatures of alkyl pyrrolidones, especially $C_8$-$C_{12}$ alkyl pyrrolidones.

Plasticizers, which enable lower gelling temperatures, are not only desirable in order to save energy in manufacturing, but also facilitate faster, homogeneous gelling with less detrimental effects of long lasting high processing temperatures on PVC stability. Lowering of processing temperatures is particularly advantageous for plastisol (paste) systems, where mechanical forces during the processing are minimal.

The compositions described herein can be used for flexible, rigid and semi-rigid PVC applications, more particularly for rigid and semi-rigid applications, where the processing requires even significantly higher temperatures than the flexible applications, with on average 50 phr plasticizers. Hence, they need more stabilizing additives and other processing aids for faster and thorough gelling. Particularly, goods made out of rigid PVC need impact modifiers and the like to minimize cracking during their service life, especially at cold conditions.

Dodecyl and oleyl pyrrolidones are particularly useful for flexible PVC, whereas octyl and dodecyl pyrrolidones are particularly useful in rigid/semi-rigid PVC.

The PVC composition may further comprise secondary plasticizers, stablizers, lubricants, flame retardants and other PVC compounding ingredients. Suitably this amount of plasticizer will form advantageous plasticized PVC in such diverse forms as calendered sheets, plastisols, foams and dispersions, in applications such as films, siding, pipe or tubing to impart flexibility, softness, extensibility and lower melting temperature to the PVC.

The non-limiting examples which follow will more particularly illustrate certain aspects of the invention.

Example 1

Typical plasticization compositions of PVC comprising an additive according to one aspect of the invention are given in Table 1 below:

TABLE 1

Plastisol formulations and test results

| Formulation # | Vestinol 9 | Surfadone LP 300 | N-Oleyl-2-Pyrrolidone | Palatinol IC | Hexamoll DINCH | Unimoll BB | Gelling Curve (° C./1000 Pas) | Transparency* | Transparency** | Haze* | Haze** |
|---|---|---|---|---|---|---|---|---|---|---|---|
| 1 | 50 | — | | | | | 86.9 | 87.8 | 85.5 | 15.8 | 23.3 |
| 2 | 49 | 1 | | | | | 85.3 | 88.8 | 87.2 | 12.1 | 17.0 |
| 3 | 47 | 3 | | | | | 82.9 | 90.2 | 88.9 | 7.8 | 11.7 |
| 4 | 45 | 5 | | | | | 80.7 | 91.0 | 90.4 | 4.1 | 7.1 |
| 5 | 40 | 10 | | | | | 73.5 | 91.3 | 90.7 | 2.3 | 6.0 |
| 6 | 40 | | 10 | | | | 80.4 | 91.2 | 90.9 | 2.5 | 4.2 |
| 7 | 30 | | 20 | | | | 74.0 | 91.2 | 90.6 | 1.1 | 3.3 |
| 8 | 35 | | | 15 | | | 78.2 | 88.3 | 86.0 | 17.1 | 24.8 |
| 9 | | 10 | | | 40 | | 77.9 | 91.3 | 91.0 | 3.0 | 5.1 |
| 10 | 35 | | | | | 15 | 77.6 | 88.1 | 85.8 | 18.3 | 25.3 |

*measured right after sample production
**measured after 6 h immersion in water and 2 h drying in air
Plasticizer quantities given are phr (PVC resin used is Vestolit B 7021/Vestolit)
All formulations contain as stabilizer 2phr Mark CZ 140
Plasticizer
Vestinol 9: DINP (Diisononyl Phthalate/Oxeno)
Surfadone LP 300: N-Dodecyl-2-Pyrrolidone (ISP)
N-Oleyl-2-Pyrrolidone: Blend of saturated/unsaturated C-16/C-18 Pyrrolidones
Palatinol IC: DIBP (Diisobutyl Phthalate/BASF)
Hexamoll DINCH: 1,2-Cyclohexanedicarboxylic acid diisononyl ester (BASF)
Unimoll BB: BBP (Butyl Benzyl Phthalate/Lanxess)

The results are illustrated in the FIGURE.

The gelling curves for rigid/semi-rigid PVC shows that even at 1 phr addition of Surfadone® LP-300 (Dodecyl Pyrrolidone) to 49 phr of DINP (Diisononyl Phthalate/Oxeno) can reduce the gelling temperature of the plastisol noticeably by 1.6° C. at 1000 Pas. On the other hand, 5 phr of dodecyl pyrrolidone added to 45 phr DINP could lower the gelling temperature by 6.2° C. at 1000 Pas. Further, 10 phr of dodecyl pyrrolidone to 40 phr of DINP shows lowering of gelling temperature up to 13.4° C. at 1000 PAS.

DIBP (Diisobutyl Phthalate/BASF) and BBP (Butyl Benzyl Pthalate/Lanxess) are commonly used to lower the gelling temperature of flexible PVC formulations. 15 phr of DIBP and BBP added to 35 phr of DINP were able to lower the gelling temperature by 8.7° C. and 9.3° C. respectively; whereas only about 6 to 8 phr dodecyl pyrrolidone was able to reduce the gelling temperature at approximately the same rate.

Transparency and haze measurements, as per ISO 13468, display significant impact of dodecyl pyrrolidone and oleyl pyrrolidones. Both can visibly increase the transparency of the system with DINP and reduce the haze dramatically. Even relatively low (1 phr to 3 phr) addition levels of dodecyl pyrrolidone showed significant improvement. By contrast, addition of 15 phr DIBP or BBP did not have remarkable effect on transparency and resulted in an increase the haze before and after immersion in water.

Example 2

Preparation of Calendered Sheets Using Compositions of Table 2

TABLE 2

| Formulation | 1 | 2 | 3 | 4 |
|---|---|---|---|---|
| PVC K-70 | 100 | 100 | 100 | 100 |
| Surfadone ® LP-300 | — | 5 | 10 | 15 |
| Drapex 39* | 3 | 3 | 3 | 3 |
| PhosBooster ® 775** | 2.5 | 2.5 | 2.5 | 2.5 |

Drapex 39* Epoxidized Soybean oil (Chemtura)
PhosBooster ® 775**(phosphite Stabilizer (Dover))

The above mentioned excipients were dry mixed on lab size roller mill to determine the temperature range (processing temperature) at which a homogeneous, cohesive PVC sheet can be produced.

Table 3 shows the substantial effect of Surfadone® LP-300 on the processing temperature of PVC. 10 phr of dodecyl pyrrolidone allows processing at temperatures which are about the same as the processing temperature for flexible PVC processing with around 50 phr of standard plasticizers.

TABLE 3

| Formulation | Processing temperatures |
|---|---|
| 1 | 195° C. |
| 2 | 185° C. |
| 3 | 175° C. |
| 4 | 165° C. |

Calendered sheets so produced were then pressed to obtain press plates for further observations. There was no anti-plasticization effect noticed with 5, 10 or 15 phr of dodecyl pyrrolidone. 15 phr of dodecyl pyrrolidone still provided clearly perceptible plasticizing effects, whereas 5 and 10 phr dodecyl pyrrolidone produced rigid PVC with certain elasticity but without any cracks even at high flexure.

The compositions disclosed herein may be used effectively in such applications as insulations and jackets for wire and cable; liners for pools, ponds, landfill, irrigation trench; sheeting for waterbeds; fabric coating; carpet backing; automotive parts like dashboards, door panels, arm rests and other; car underbody coating; tiles; wall coverings; flooring sheets; packaging films; conveyor belts; tarpaulins; roofing membranes; electrical plug and connections; inflatable shelters; toys; garden hose; pipes and tubings; agricultural films; refrigerator and freezer gasketing; shoe soles and uppers, boots; fishing lures manufactured by using one of the state of the art technologies like calendering, extrusion, plastisol, foam, dispersion.

While the invention has been described with particular reference to certain embodiments thereof, it will be understood that changes and modifications may be made which are within the skill of the art.

What is claimed is:

1. A PVC composition comprising PVC and a $C_4$-$C_{30}$ alkyl pyrrolidone additive present in an amount of 1 to 10 phr sufficient to improve PVC processing or treatment compared to a control composition without said additive.

2. The PVC composition according to claim 1 wherein the additive is present in an amount of 1 to 5 phr.

3. The PVC composition according to claim 2 wherein the additive is present in an amount of 3 to 5 phr.

4. The PVC composition according to claim 1 wherein the PVC composition exhibits at least one of: decreased gelling temperature; increased gelling speed; increased transparency; increased homogeneity; reduced haze; reduced hardness; improved melt flow;
improved impact resistance; improved filler compatibility; increased cold flexibility; improved crack resistance and increased secondary plasticizers/extenders compatibility as compared to the control composition.

5. The PVC composition according to claim 1 wherein the $C_4$-$C_{30}$ alkyl pyrrolidone includes linear, branched or cyclo-alkyl pyrrolidones.

6. The PVC composition according to claim 1 wherein the $C_4$-$C_{30}$ alkyl pyrrolidone is liquid at room temperature.

7. The PVC composition according to claim 1 in the form of a rigid, semi-rigid or flexible PVC product wherein said product is formed by one or more of calendering, extrusion, injection molding, plastisol, foam, and dispersion.

8. The PVC composition according to claim 7 wherein said product is selected from the group consisting of pipes, tubes, windows, door profiles, rigid sheets, packaging, insulation jackets for wires and cables, liners for pools, ponds, landfill, irrigation trench, sheeting for water beds, fabric coating, carpet backing, automotive parts like dashboards, door panels, arm rests, car underbody coating, tiles, wall coverings, flooring sheets, packaging films, conveyor belts, tarpaulins, roofing membranes, electrical plugs and connections, inflatable sheets, toys, garden hose, pipes and tubing, agricultural films, refrigerator and freezer gasketing, shoe soles and uppers, boots, and fishing lures.

9. A PVC composition comprising PVC and a $C_4$-$C_{30}$ alkyl pyrrolidone additive present in an amount of 0.1 to 3 phr sufficient to improve PVC processing or treatment compared to a control composition without said additive.

10. The PVC composition according to claim 9 wherein the additive is present in an amount of 0.1 to 1 phr.

11. The PVC composition according to claim 9 wherein the PVC composition exhibits at least one of: decreased gelling temperature; increased gelling speed; increased transparency; increased homogeneity; reduced haze; reduced hardness; improved melt flow; improved impact resistance; improved filler compatibility; increased cold flexibility; improved crack resistance and increased secondary plasticizers/extenders compatibility as compared to the control composition.

12. The PVC composition according to claim 9 wherein the $C_4$-$C_{30}$ alkyl pyrrolidone includes linear, branched or cycloalkyl pyrrolidones.

13. The PVC composition according to claim 9 wherein the $C_4$-$C_{30}$ alkyl pyrrolidone is liquid at room temperature.

14. The PVC composition according to claim 9 in the form of a rigid, semi-rigid or flexible PVC product wherein said product is formed by one or more of calendering, extrusion, injection molding, plastisol, foam, and dispersion.

15. The PVC composition according to claim 14 wherein said product is selected from the group consisting of pipes, tubes, windows, door profiles, rigid sheets, packaging, insulation jackets for wires and cables, liners for pools, ponds, landfill, irrigation trench, sheeting for water beds, fabric coating, carpet backing, automotive parts like dashboards, door panels, arm rests, car underbody coating, tiles, wall coverings, flooring sheets, packaging films, conveyor belts, tarpaulins, roofing membranes, electrical plugs and connections, inflatable sheets, toys, garden hose, pipes and tubing, agricultural films, refrigerator and freezer gasketing, shoe soles and uppers, boots, and fishing lures.

\* \* \* \* \*